2 Sheets—Sheet 1.
J. M. BOORMAN.
HAY LOADER.
No. 101,705. Patented Apr. 12, 1870.
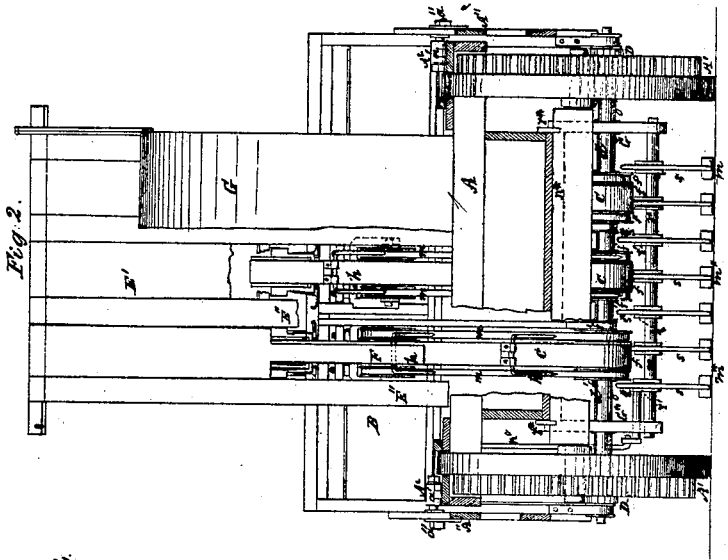
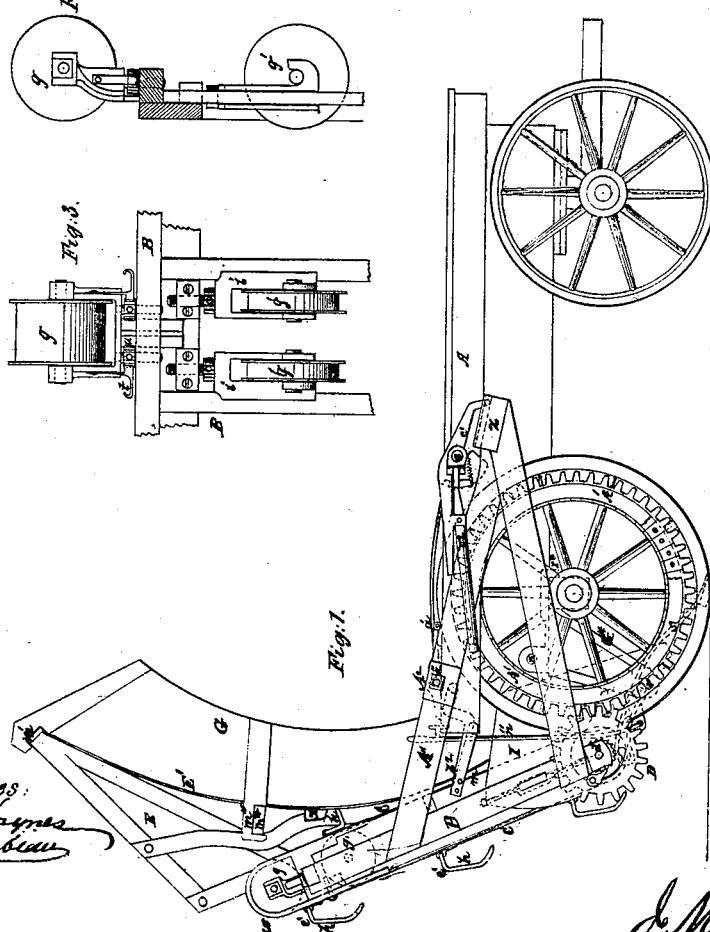

2 Sheets—Sheet 2.
J. M. BOORMAN.
HAY LOADER.
No. 101,705. Patented Apr. 12, 1870.
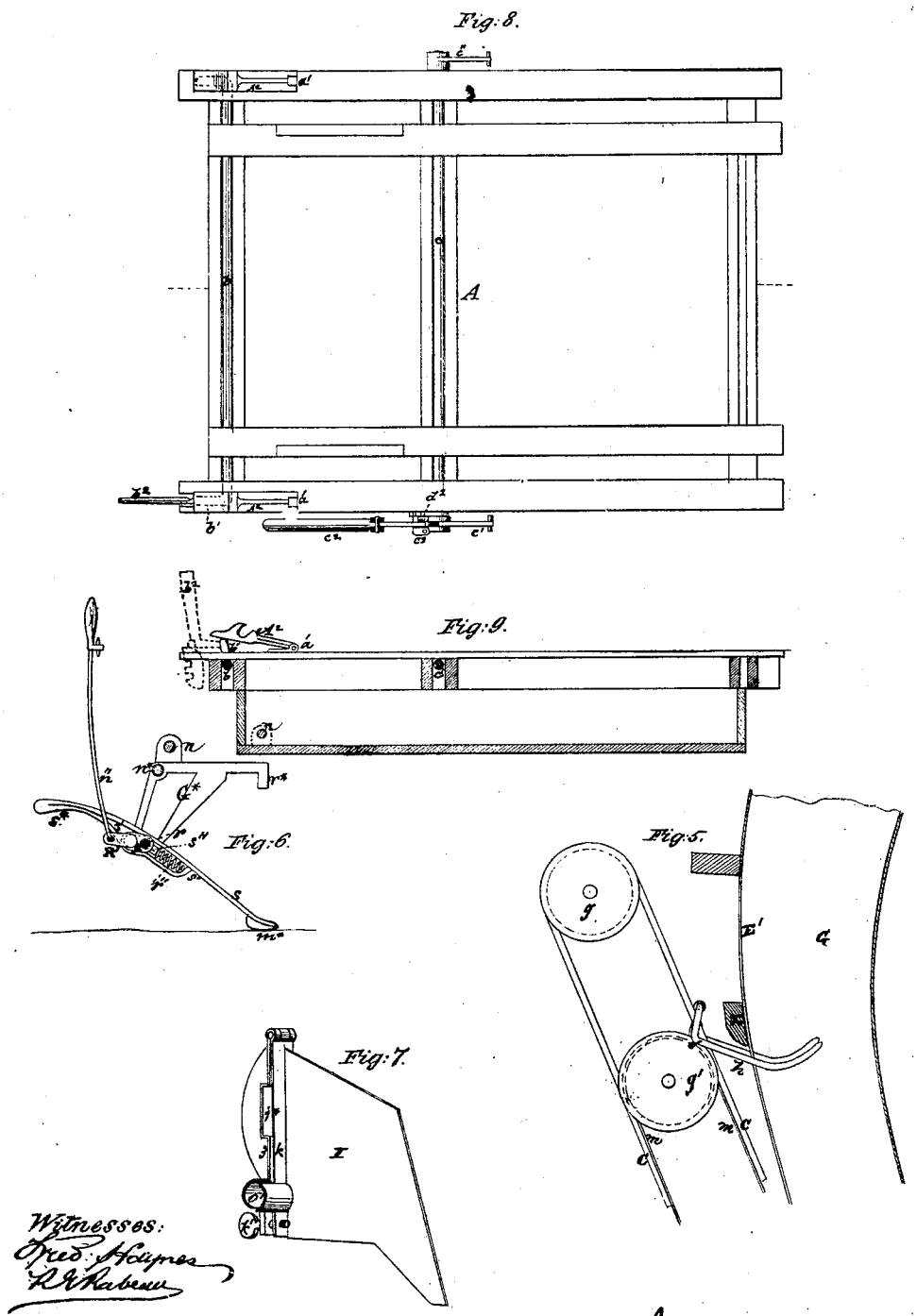

United States Patent Office.

JOHN MARCUS BOORMAN, OF SCARBOROUGH, NEW YORK.

Letters Patent No. 101,705, dated April 12, 1870.

IMPROVEMENT IN HAY-LOADERS.

The Schedule referred to in these Letters Patent and making part of the same.

*To all whom it may concern:*

Be it known that I, JOHN MARCUS BOORMAN, of Scarborough, in the county of Westchester and State of New York, have invented certain new and useful Improvements in Hay-Raking and Loading Machines; and I do hereby declare that the following is a full, clear, and exact description of the same, reference being had to the accompanying drawings forming a portion of this specification, in which—

Figure 1 is a side view of an apparatus constructed according to my invention.

Figure 2 is a front and partial sectional view of the same.

Figure 3 is a front view; and

Figure 4, a side view, showing the position of certain essential parts of the machine.

Figure 5 is a vertical longitudinal section, showing the relative arrangement of the carrier-belts and their forks, the guides of the latter, and the chute through which the hay passes upward on its way to the vehicle.

Figure 6 is a side view of one of the teeth of the rake employed for gathering the hay from the ground, and some of the adjuncts of such rake.

Figure 7 is a view representing a guard so applied as to prevent the hay from the machine from clogging the wheels of the vehicle.

Figure 8 is a plan view, and

Figure 9, a vertical longitudinal sectional view of the frame or rigging used upon the vehicle, and in connection with the raking and loading mechanism.

Similar letters of reference indicate corresponding parts in all the figures.

The object of this invention is to provide an apparatus for raking hay and other similar crops from the ground, and carrying or depositing the same upon the vehicle by which it is to be transported to the stack or other place of storage or deposit, which shall operate in a more perfect manner, with greater convenience to the attendants, and with less liability to be deranged by the vicissitudes of actual use than has hitherto been secured in machines of this class.

To enable others to understand the construction and operation of my invention, I will proceed to describe it, with reference to the drawings.

The vehicle in connection with which the apparatus is to be used may be of any ordinary or suitable kind, and is provided with a rigging, A, the construction of which will be hereinafter more fully described.

The rearmost wheels of the vehicle have fastened upon their outer sides toothed or cogged rims, $A^1$.

Hinged upon the upper surfaces of either side of the rigging A, at the rearmost end thereof, as shown at $a'$, is a bar, $A^2$.

Each of these bars $A^2$ extends back, and has formed at some distance back of its hinge $a'$ a notch or recess, which forms a bearing for strong cylindrical studs or pivots, $a''$, turning freely therein, and extending inward from the adjacent triangular side frames $A''$ of the frame-work B, which carries the elevating mechanism of the apparatus, which, being thus hung and not otherwise fastened, is free to settle by its own weight until brought to rest by its driving-pinion D falling into gear with cogged rim $A^1$, when not controlled by force applied by levers $C'$ $C''$, through their points sliding in and between grooved plates $z$ at the further end of $A''$, so as to tilt the same, as hereinafter appears.

At the rear end of the rigging is a stiff transverse rod, $b$, having at each end an arm, $b'$, arranged underneath the backwardly-extending ends of the bars $A^2$ in such manner that when the rod is turned by the forward movement of the lever $b^2$ at one of its ends, the two bars $A^2$ will be lifted and pushed forward or turned upon their hinges in a curved line, as indicated in fig. 9, whereby the whole elevating mechanism is also lifted and pushed forward in a curved line, and the forward end of $A''$, which is furnished with grooved plates $z$, slid forward upon and along levers $C'$ $C''$, so that pinion D is revolved around and raised upon cogged rim $A^1$ in corresponding curve, without being ungeared therefrom, and the elevation of the whole is somewhat increased, and may be thus adjusted to suit differences in ground traversed or in the crop operated upon.

If arm $A^2$, which is necessarily very much exaggerated in the drawings to allow a clear exhibition of it, were made shorter, so as to lessen the space between hinge $a'$ and arm $b^1$, the curve described by stud $a''$ would be sharper, and its forward movement relatively increased, so that a perfect adjustment of the gearing would be obtained for all positions, as above described.

That the arms $b^1$ of the rod $b$ may be retained in position to hold the aforesaid bars in their elevated condition, the lever $b^2$ is furnished with a spring pawl, which works into a fixed ratchet placed in suitable relation thereto and to the lever itself.

Passing transversely across the rigging A, somewhat in rear of the center thereof, is a rod, $c$, upon the ends of which are two forwardly-extending lever-arms, marked respectively $c'$ and $c''$, the former being also extended back to form a kind of lever, and having pivoted to it a supplemental lever, $c^2$, the inner end of which is arranged in such relation with a laterally-moving spring pawl, $c^3$, pivoted to the lever or lever-arm $c'$, that when $c^2$ and the rear portion of $c'$ are not brought together, the pawl will hold within and against one of the notched shoulders of a ratchet-plate, $d^2$, attached to the adjacent side of the rigging, in such a way that the forward ends of the lever-arms $c'$ and $c^2$ will serve as stops to resist any further upward movement of the forward extremities of the side frames, and, by means of grooved plates $z$, will also resist any downward movement, and hold said arms A fixed in whatever position they may thus be placed, thereby serving to hold the pinion D locked in or out of gear with A, as may be desired.

By the supplemental lever $c^2$, it is caused to automatically detach the pawl from the ratchet-plate $d^1$, and then acting upon the rearwardly-projecting portion of the lever or lever-arm $c^1$, will raise the same, and by turning the rod $c$, turns downward both lever-arms $c'\ c''$, and thereby depresses the forward ends of the side frames A, the object of this being to bring the driving pinions of the elevating mechanism out of gear with the cogged rims $A^1$ of the rear wheels of the vehicles, as hereinafter more fully explained.

The several parts are kept in this position, when desired, by the catching of the pawl $c^3$ upon an upper shoulder of the ratchet-plate $d^2$.

In order to return the parts to their former position, with the driving pinions in gear with the cogged rims $A^1$, it is only necessary to detach the pawl from the ratchet-plate by bringing the supplemental lever $c^2$ nearer the rear part of the lever-arm $c^1$, while depressing the same.

The two side frames A'' are connected at their rear ends by a nearly vertical frame, B, forming, in connection therewith, the frame-work of the elevating portion of the machine.

This frame B has at bottom a transverse driving-shaft, $d$, which is driven by pinions D on either end, and which are themselves driven by rims $A^1$ on the rear wheels of the vehicle, and are furnished with pawls and ratchets, so that a reversal of their movement will cause no detriment to the machinery actuated by them.

Upon such shaft $d$ is a series of pulleys, $f$, carrying endless belts C, which extend upward over pulleys $g$ at the top of the frame B.

The frames which carry these pulleys $g$ are capable of being adjusted to regulate the tension of the belts by ratchet-screws $u$, fitted with spring pawls $t$.

Each belt is furnished with a suitable number of forks, each having two or more tines, as may be preferred.

These forks are so shaped as to have shoulders $e'$, the purpose of which will presently herein appear, and are pivoted or made capable of turning in suitable bearings, by which they are attached to the belts.

The driving-shaft $d$ has fixed upon it, intermediate with its pulley $f$, grooved pulleys $f'$.

Arranged in line with these, near the upper part of the frame B, and upon pivots provided in adjustable bearing $i$, are the grooved pulleys $g'$. From the pulleys $f'$, to and over the pulleys $g'$, run endless metal or composition bands $m$.

These endless bands $m$ are, when using two-pronged forks, as in the drawings, situated one upon either side of each endless belt C, and are so placed that, as the forks are carried upward at the front of the frame B by the movement of their endless belts, their shoulders $e'$ will strike and rest against the endless bands $m$ in such a way that the forks are held in the position required for holding the hay upon them; but, on reaching the tops or upper end of such bands and passing beyond the same, will be suffered to drop, to disengage the hay therefrom, as necessary, in its way toward deposition upon the vehicle.

Attached in any suitable manner, at the back of the clearing-bars, as shown in fig. 1, is a transverse bar, $x$, so arranged that when the tines of the carrying forks are dropped to release or discharge the hay, they will pass immediately underneath such bar and have their clearance very materially facilitated thereby.

Fixed guides may, if desired, be substituted in place of endless bands $m$, but these latter are very much preferred.

Attached to the upper part of the frame B, but capable of detachment therefrom, is a frame-work, E, which carries a forwardly-curving deflecting surface, E', of elastic wood or sheet-metal. Extending downward from this, between the endless belts, are a number of clearing-bars, E'', and alternating with these are supplemental clearing-bars F, the lower ends of which are provided with shoes resting upon the forward surfaces of the belts. As the belts rotate, the tines of the forks pass upon either side of the lower ends of the supplemental clearing-bars F, which, from their elastic nature, not only prevent the hay being dragged behind them and between bars E'', but facilitate its passage upward by receiving and imparting back whatever momentum may be lost by the gradual clearing of the forks, as well as imparting and propagating up to the upper surface E the tremor received from action of the belts, to overcome the tendency to clog, which would exist in a more rigid frame.

Hung upon or attached to the front of the frame E, parallel or nearly so with its inclined or curved surface, is a curved chute, G, the sides of which are closed, and which is attached to the frame E by hook portions $m'\ m''$, catching and suitably fastened, the one upon the top, the others upon lateral projections $m^2$ at the sides of the frame E, as shown in fig. 1.

This chute, it will be seen, is so arranged that as the hay is carried upward by the forks it will traverse the chute, and be ejected from its upper end forward upon the vehicle in front.

The rake by which the hay is gathered from the ground and presented to the elevating mechanism is carried by a separate supporting-frame, G*, attached by suitable appliances to the rear of the vehicle.

The rake itself is more fully represented in fig. 6.

The rake-head $r$ is provided at intervals with transverse supporting pieces $r'$, upon which are placed the rake-teeth $s$, each formed with an oblong loop, $s'$, at a suitable distance above its point or shoe $m^*$, within which its supporting pieces $r'$ are placed.

The rake-head is further furnished with a short arm, $s''$, projecting forward in front of each supporting piece, and occupying part of the forward portion of the loop $s'$ in each tooth $s$.

Upon this arm is a spiral spring, $r''$, which presses the rake-tooth forward, yet allows it to yield upward and backward when its point strikes an unusual obstruction, while its point is guided upward by the elbow-shape form of loop $s'$, to facilitate its clearance therefrom.

The retention of each rake-tooth in place is profor by this spring, and also by the grooving of the upper and under sides of the supporting-piece upon which it is fitted.

The forward end of each tooth is furnished with a peculiarly-shaped shoe, $m^*$.

This shoe is nearly flat upon its upper surface, to which the tine is attached, slanting forward and downward, with its point turned slightly upward, and with its under side made curved in its longitudinal section, in such manner that, as the machine is drawn forward with the shoes of the rake-teeth running upon the ground, the points of the shoes will be at a slight distance, say one-half an inch from the surface, so that the teeth may pass over slight obstructions, and thereby obviate danger of sticking in the ground and interfering with the efficient action of the apparatus, the widening of the loop $s'$ opposite back extension $r'$, allowing a slight play for this purpose, without pressing back springs $r''$, which only yield to more considerable obstructions, as above stated.

The rake-head is provided at one end with a backwardly-extending arm, $u'$.

To this is attached a vertical rod, $u''$, provided with a stud or hook at its upper end, by which it may be hooked against the adjacent portion of the rigging to retain it in an elevated or depressed position, the forwardly-projecting parts of the teeth thereof being lifted clear of the ground, or lowered thereto for operation, by simply elevating or depressing the rod just mentioned.

The rearmost portions $s^*$ of the rake-teeth are extended back to and between, so that some of them touch, or nearly so, in passing, the forked elevating bands $c$, and the remaining portion alternating with them reach higher, so as to nearly touch the hereafter-described sleeve $o$ of the driving-shaft $d$, when the same is in action, thus preventing the hay from slippling beyond, all arranged in such position that the tines of the elevating-forks may pass between them in the operation of the machine. This construction of the rake-teeth preventing the hay from slipping through, and enabling the hay to be taken therefrom by the forks with very great facility.

In using the apparatus attached in rear of the vehicle, as hereinbefore explained, the forward movement of the whole causes the rake-teeth to gather the hay from the ground. The hay passing back upon the rear portions $s^*$ of the teeth is lifted therefrom and carried upward by the forks on the endless belts, and into and through the chutes, the forks being meanwhile kept in position to sustain and carry the hay, by the contact of its shoulders $e'$ with the endless guides or bands $m$. These bands meanwhile impart their momentum to the ascending hay until their straight portions shall have passed behind the clearing-bars E and F, as shown in fig. 5, at a point opposite the upper portions of said bands $m$; here, by contact with cross-bar $x$, suitably placed, they are at once disengaged from the hay, and made to slide behind said bar $x$, imparting, at the same time, their remaining momentum to the hay.

The hay, thus left in the upper part of the chute, is continuously pushed upward by the pressure of that carried up below it by the action of the forks, and being prevented from clogging by the elastic character of frames E and G, is finally ejected forward upon the rigging carried by the vehicle.

It will be noticed that when, for any reason, it is desired to elevate the rake-teeth from the ground, it may be done by manipulating the rod $u''$.

When it is necessary to lift the elevating mechanism without throwing it out of gear with the cogged rims $A^1$, the lever $b^2$ is actuated to raise the parts $A^2$, in which the side-frames $A''$ are pivoted, as hereinbefore fully explained, and when it is sought to throw the elevating mechanism out of gear, it is done by operating the lever $c^2$ to depress the forward parts of the side frames $A''$, to bring the driving-pinions out of gear with the cogged rims.

In order to prevent the hay from clogging the driving-pinions, the cogged rims, &c., there is attached to each end of the shaft $d$, a shield, I, shown in detail, and on an enlarged scale in fig. 7.

The plate or flat portion extends forward upon the inner sides of the rear wheels of the vehicle, and also back far enough to guard the adjacent driving-pinion.

It is constructed with a clasp, the two parts, $j\ k$, of which are hinged together at top, and are furnished with a recess or socket, $j^*$, for gripping one of the cross-bars of the frame B, and with a sleeve-like portion, $o'$, for clasping upon the shaft $d$.

The two parts $j\ k$, are brought toward each other to be clamped in place, as just indicated, by means of a screw, $k'$, at the lower ends thereof.

In order to prevent the hay from winding upon the shaft $d$, this shaft has provided upon it, intermediate with its several pulleys, a series of fixed sleeves, $o$, which are necessarily made in two sections, bolted together and kept from turning upon the shaft by suitable connection with the adjacent uprights of the frame B, supporting the parts under consideration.

In order to facilitate the attachment of the shaft $d$ to the frame B, the bearings of such shaft, whether made in one or two sections, are held in place upon the lower ends of the uprights just referred to, by suitable metal straps fastened to the upright by transverse bolts.

When desired, the chute, clearing-bars, &c., may be detached, and above each of the guides $m$ is placed a cap-piece, $w$, which forms a continuation of the frame, so that, as the apparatus is drawn along, the forks, instead of dropping the hay in front, will be so kept in position as to carry it back over the top of the apparatus, this latter being thus enabled to act as a hay-tedder when required.

What I claim as my invention, and desire to secure by Letters Patent, is—

1. The transverse rod $c$, furnished with lever-arms $c'\ c''$, in combination with the supplemental lever $c^2$, pawl $c^3$, ratchet-plate $d^2$, and the frame-work, carrying the elevating mechanism, whereby such framework may be tilted to throw the elevating mechanism out of gear with the cogged rims $A'$, substantially as and for the purpose herein set forth.

2. The bars or parts $A^2$, pivoted or hinged to the rigging, provided with bearings for the studs or axles of the framework, carrying the elevating mechanism, and having combined therewith the operating-lever $b^2$, and transverse rod $b$ with the arms $b'$, whereby the elevating mechanism, when desired, may be lifted and adjusted at any desired height from the ground without throwing the driving-pinions out of gear with the rims A, substantially as herein set forth.

3. The elevating mechanism and its attachment, when suspended to the vehicle by the studs or axles $a$, fitting into notches or bearings in the hinged part $A^2$, suitably provided upon the rigging, as set forth.

4. The arrangement of the supplemental clearing-bars F, resting upon the endless fork, carrying, belts O, in combination with the clearing-bars E, forming the back of the chute, and operating to assist the disengagement of the hay from the forks, substantially as herein set forth.

5. The guides $m$, in the form of endless bands, in combination with hinged forks, having bent tines, so as to sustain them in position upon their endless belts while carrying the hay, and so permit its ready disengagement therefrom when lifted to the desired height, all arranged and operating substantially as herein set forth.

6. The combination and arrangement of the bar $x$ with the bent forks $h$ on the endless belts, and the guides $m$, governing the movement of said forks, substantially as and for the purpose herein set forth.

7. The rake-teeth $s$, constructed with the shoes $m^*$ and loops $s'$, arranged upon the supporting pieces $r$ of the rake-head, and in suitable relation with the spring $r''$, substantially as herein set forth.

8. The chute G, closed at the sides, and provided with clearing-bars E'' and F, in combination with the elevating apparatus, all constructed and arranged substantially as and for the purpose herein set forth.

9. The triangular frame $G^*$, with its hooks $r^*$, rod $n^*$, bolt or bolts $n$ carrying rake-head $r$, the whole arranged to provide for the attachment of the rake to the vehicle, substantially as herein set forth.

J. MARCUS BOORMAN.

Witnesses:
FERDINAND TRUSCH,
HENRY PALMER.